United States Patent [19]

Riddell et al.

[11] Patent Number: 4,730,180

[45] Date of Patent: Mar. 8, 1988

[54] HOSE PAYOUT ALARM SYSTEM

[76] Inventors: Gary L. Riddell, 825 Drake St., P.O. Box 370040; Rolf W. Loeffler, P.O. Box 524, 498 Eighth St., both of Montara, Calif. 94037; Gary R. Kennedy, 2145 Carlos St., Moss Beach, Calif. 94038

[21] Appl. No.: 848,793

[22] Filed: Apr. 7, 1986

[51] Int. Cl.$^4$ .................... B60Q 1/00; G08B 21/00
[52] U.S. Cl. .................... 340/52 R; 340/540; 280/4; 280/480
[58] Field of Search ........... 340/540, 668, 320, 52 R, 340/22; 239/71–73, 195–200; 242/148, 49; 200/61.15, 61.19; 280/4, 477, 480

[56] References Cited

U.S. PATENT DOCUMENTS

| | | | |
|---|---|---|---|
| 3,340,522 | 9/1967 | Chick et al. | 200/61.19 |
| 3,850,380 | 11/1974 | Kranefeld | 242/49 |
| 4,325,058 | 4/1982 | Wagner et al. | 340/546 |

FOREIGN PATENT DOCUMENTS 2735504  2/1979  Fed. Rep. of Germany ........ 242/49

Primary Examiner—James L. Rowland
Assistant Examiner—Brian R. Tumm
Attorney, Agent, or Firm—Flehr, Hohbach, Test, Albritton & Herbert

[57] ABSTRACT

A hose laying vehicle employs a mechanical connection between a loop of hose and a switch for activating a warning device for a predetermined period.

4 Claims, 6 Drawing Figures

FIG_1
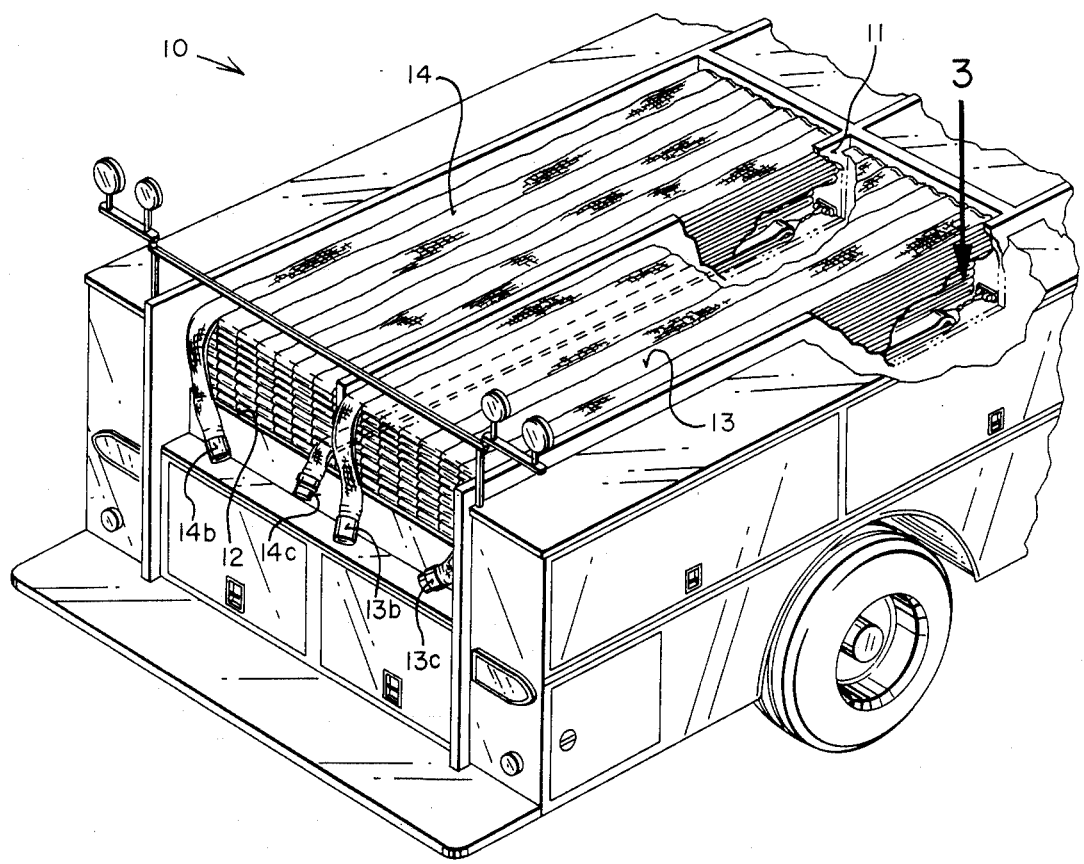
FIG_2
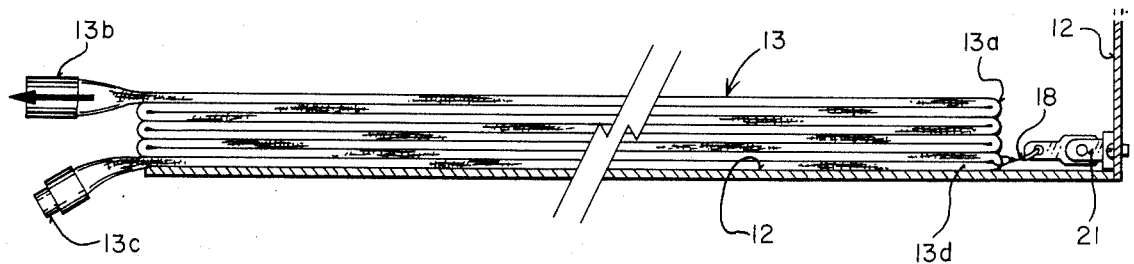

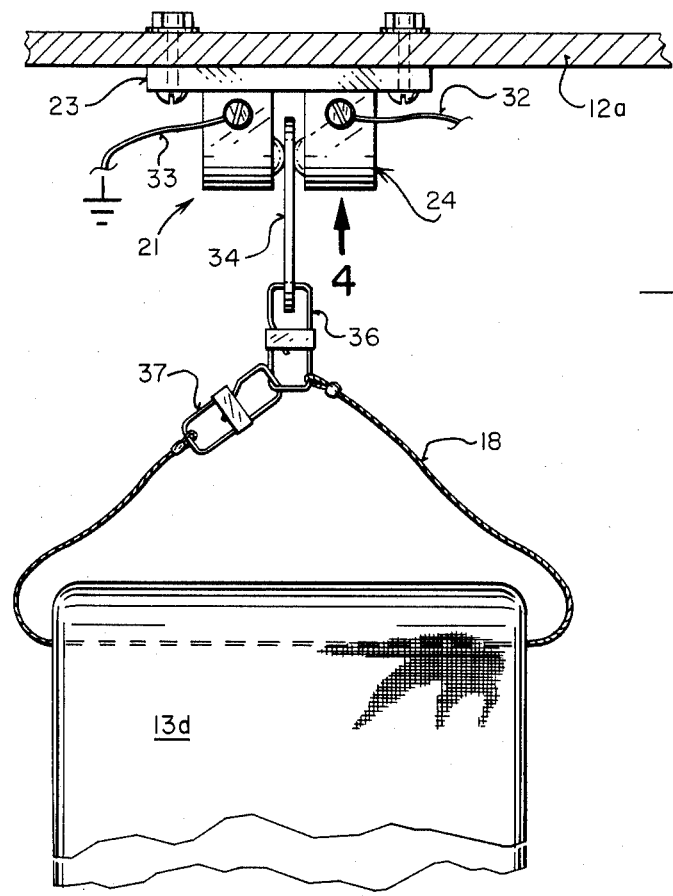
FIG_3
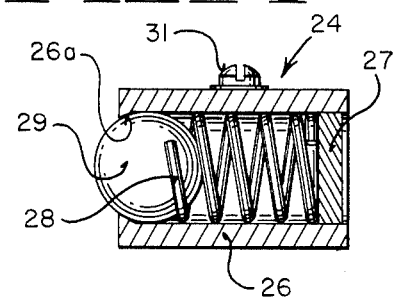
FIG_4
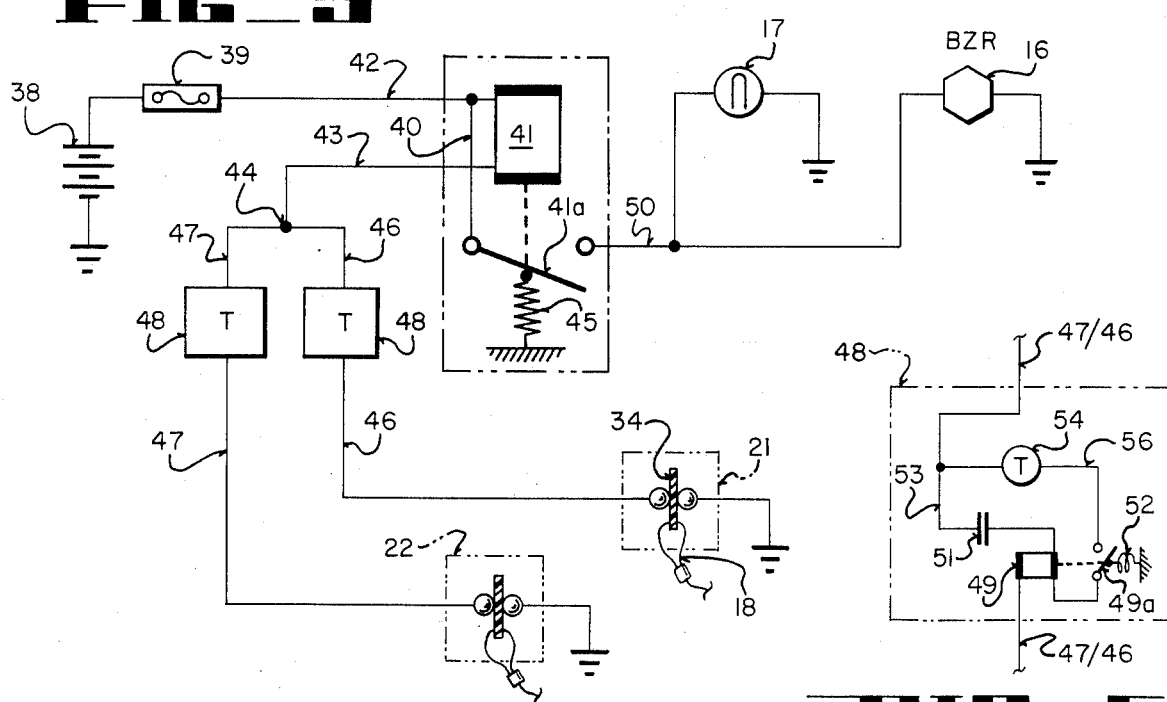
FIG_5
FIG_6

HOSE PAYOUT ALARM SYSTEM

This invention pertains to a hose payout alarm system which is particularly useful on fire trucks for warning the driver that hose being paid out, usually from the rear of the truck, is approaching the bitter end.

BACKGROUND OF THE INVENTION

A hose truck of a type as used in fighting fires, may employ one or more hoses folded in loops in a manner whereby both the male and female ends of each hose are exposed at the rear of the fire truck. When called to duty, the hose truck attempts to locate the nearest fire hydrant to the fire. The female end of the hose is, in some cases, wrapped about the fire hydrant so that as the hose truck proceeds, hose will be paid out from the rear of the truck. It is important to avoid paying out all of the hose so that appropriate connections can be made to the other hose if desired without losing any additional time.

Accordingly, as disclosed herein a system has been provided for warning the operator of the hose truck that the hose being paid out is approaching the bitter end. Given this warning, the driver can stop the vehicle and the appropriate connections can be made.

Where another hose is to be coupled to the first and then subsequently paid out further so as to extend the hose to include the length of both, the system as herein disclosed contemplates the use of a single alarm unit in the operator's compartment capable of also being activated by withdrawing a given portion of the second hose near or approaching the bitter end thereof.

SUMMARY OF THE INVENTION AND OBJECTS

In general for use with a vehicle having hose to be laid an alarm system for alerting an operator of the vehicle to the payout of a given portion of hose indicating the approach of the bitter end of the hose being paid out includes an electric warning device for alerting the operator when activated. An electric circuit serves to operate the device and includes switch means therein conditioned to be normally open. Means forming a mechanical connection between the switch means and the given portion of hose serves to close the circuit means in response to paying out the given portion of hose near the bitter end so as to activate the warning device.

In general it is an object of the present invention to provide a warning device associated with one or more hoses in a vehicle having hose to be laid therefrom for purposes of alerting the operator of the vehicle that substantially all of the hose to be laid has been discharged.

It is another object of the invention to provide a relatively simplified means for accomplishing the foregoing.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic perspective view of the rear quarter of a hose carrying truck characterized by a plurality of hose bays;

FIG. 2 shows a diagrammatic side elevation partially in section of a hose folded in a number of loops as carried in the vehicle shown in FIG. 1 and showing a means for mechanically coupling a switch to the hose;

FIG. 3 shows an enlarged detailed plan view of a switch means taken from the region identified by the numeral 3 in FIG. 1;

FIG. 4 shows a side elevation section view taken in the region of the number 4 of FIG. 3 and showing a portion of the switch means;

FIG. 5 shows a diagrammatic electrical circuit operated in accordance with the invention; and FIG. 6 shows a diagrammatic detail view of a timer assembly of a type suitable for use in FIG. 5.

DETAILED DESCRIPTION OF A PREFERRED EMBODIMENT

A hose laying vehicle 10 such as a fire hose truck shown in FIG. 1 includes a partition 11 running longitudinally of the hose bed 12. A plurality of at least two elongate fire hoses 13, 14 are each folded to provide a number of loops 13a (FIG. 2) stacked one upon the next.

Preferably hoses 13, 14 are folded in a manner whereby the opposite ends 13b, 13c and 14b, 14c are disposed to be accessible at the back of hose truck 10. When approaching a fire, hose from one side of the bed 12 is wrapped about a fire hydrant so that truck 10 can move away from the hydrant and cause hose to pay out from the back of truck 10. As the hose nears the bitter end of its length, as described herein below, an alarm warns the driver to stop so that hose from the other side of the bed can be coupled to the first hose and form a continuation of it as the truck resumes its movement. When the second hose nears the bitter end of its length, the alarm again sounds a warning to the driver to cause him to stop and permit the crew to attach the hose to the truck pumping equipment.

While each hose 13, 14 is shown as a single continuous length of hose, it is to be understood that usually each hose 13, 14 will be made from a number of shorter sections connected together in tandem.

An electric warning device such as a buzzer 16 or flashing light 17 becomes activated in response to paying out a given portion of a hose signifying the approach of the bitter end of the hose. For example, as shown best in FIGS. 2 and 3, the last or next-to-last loop 13d captures a tendon or suitable cable 18. Tendon 18 forms a mechanical connection for operating a switch 21 for purposes described further below.

Switch 21, as shown in FIGS. 3 and 4 has been referred to as a "pull trap" and comprises a base plate 23 bolted to the leading wall 12a of hose bed 12. Base plate 23 carries a pair of laterally spaced apart terminal assemblies 24 (FIG. 4). Each terminal assembly 24 comprises a cylindrical housing 26 of conductive material such as metal. The end of housing 26 has been closed by a transverse metal plate 27. A spring 28 urges a steel ball 29 axially toward the open end of housing 26. The open end of housing 26 includes inwardly converging walls 26a serving to prevent ball 29 from being totally discharged therefrom. In addition, the top of housing 26 carries a terminal 31 to which an electrical lead 32 can be attached.

The other side of terminal assembly 24 has been constructed substantially as a mirror image of the construction described above with respect to FIG. 4. The spacing, however, between each half of terminal assembly 24 is such that when the steel balls 29 are urged outwardly they will contact and form a circuit therebetween thereby connecting lead 33 with lead 32. Switch 21 (as well as switch 22) includes a removable element 34 of insulating material normally disposed in a manner to provide an interruption in the circuit with the element 34 installed and to complete a circuit between leads 32, 33 when element 34 has been removed from its associated switch 21, 22.

Accordingly, by mechanically coupling tendon 18 to the last loop 13d or other suitable portion of the hose being paid out, it will be evident that when loop 13d is drawn forwardly to be paid out element 34 will be withdrawn from between balls 29 so as to permit the springs 28 to drive them together and form a completed circuit therebetween.

Tendon 18 is arranged with conventional clips 36, 37 capable of being readily detached from one another or detached from element 34.

Means providing an electrical circuit for operating buzzer 6 and flashing light 17 in parallel includes a power supply such as battery 38 connected through a fuse 39 via lead 42 to a relay 41. The output from relay 41 can be traced along lead 43 to a junction 44 between a pair of sensing branches 6, 47. Sensing branches 46, 47 are identical, and accordingly a description of one will be deemed sufficient to provide a description of the other. Accordingly, branch 47 includes a timing circuit 48 of a type for normally completing a circuit therethrough and electrically activated to maintain a completed circuit for a predetermined period of time and thereafter to provide an open circuit so as to limit the period of operation of the warning devices 16, 17.

Branch 47 further includes an associated one of the two switches 21, 22 described above.

A suitable timing circuit 48 shown in FIG. 6 is used in both branches 46, 47 for carrying out the foregoing functions. Circuit 48 (described as appearing in branch 47) includes a relay 49 and a capacitor 51 disposed in circuit with branch 47. A switch armature 49a operated by relay 49 is normally open under the force of a spring 52. As arranged, the timing circuit 48 comprises pick and hold branches 53, 56 for operating relay 49. The hold branch 56 includes a timer unit 54 of known design which when energized serves to operate for a predetermined period and then provides an open circuit.

From the electrical schematic drawing of FIG. 5, it is evident that closure of relay armature 41a against the force of spring 45 serves to define an electrical path commencing at the positive side of battery 38 and traced along lead 42, lead 40, armature 41a, lead 50 and to ground via the parallel warning devices 16, 17.

In operation, upon withdrawing spacer 34 from switch 21, a circuit via branch 46 will be completed to ground through switch 21 as now to be described.

The positive terminal of battery 38 supplies a dc current via lead 42 through relay 41 to lead 43. Since branch 46 has been grounded, current flows into timing circuit 48 via branch 46 to commence charging capacitor 51. As capacitor 51 is being charged, a current will flow through relay 49 to ground via switch 21. Accordingly, relay 49 will pull armature 49a to a closed condition with respect to the hold branch 56 whereby current will now flow through timer 54, along branch 56, through armature 49a, relay 49 and pass to ground via the remainder of branch 46 through switch 21.

Having closed armature 49a current will remain in branch 46 until timer 54 opens the holding branch 56.

During the foregoing period, however, current will also be passing through relay 41 to close its associated armature 41a to complete an electrical circuit traced along leads 42, 40, armature 41a, lead 50 as noted above. When timer 54 has "timed out" capacitor 51 prevents any further dc current from passing to relay 49 while spring 52 serves to open the holding circuit of branch 56.

By providing a pair of independent branches 46, 47 for independently operating the system in response to removal of spacer elements 34 of associated switches 21, 22 it will be evident that the driver will first be warned when the bitter end of the first hose has been nearly reached so that the driver can stop the truck and the crew make appropriate connections. At that point the vehicle can continue forwardly laying the remainder of the hose until warned of the imminent approach of the bitter end of the second hose.

Finally, it will be evident that during the laying of the second hose, buzzer and flashing light 16, 17, respectively, will have been reset by virtue of the fact that the open armature 49a and capacitor 51 will block any additional dc current through timing circuit 48 of branch 46 thereby permitting spring 45 to open the alarm circuit. This, however, still leaves branch 47 in condition for operation as above described with respect to branch 46.

We claim:

1. A hose laying vehicle, said vehicle having a hose bed, a length of fire hose folded in loops and lying in said hose bed in a manner disposing both ends of said hose at a common end of said bed, a hose payout alarm system carried by said vehicle for use in alerting the vehicle operator of the imminent discharge of the end of hose being paid out, said system comprising an electrically operated warning device disposed near the operator, means forming an electric circuit for operating said warning device, swithc means in said circuit, said switch means having a removable element of insulating material normally disposed in a manner to provide an interruption in said circuit with said element installed and to complete the circuit via said switch means when said element is removed from said switch means, means coupling said element to a given one of said loops of hose near the bitter end thereof, said given one of said loops serving to tug on said coupling so as to withdraw said element when said given one of said loops of hose is paid out, withdrawal of said element serving to permit said switch means to complete said circuit to activate said warning device.

2. In a hose laying vehicle comprising a hose bed, a plurality of at least two hoses disposed in said bed and folded in loops in a manner disposing both ends of each hose at the same end of said hose bed and arranged to be paid out from said end of said vehicle, an alarm system for alerting the vehicle operator of the iminent approach of the bitter end of either of said hoses as they are being paid out, an electrically operated warning device carried by said vehicle at a location to be readily monitored by the vehicle operator, electric circuit means for operating said warning device in response to paying out a given loop of either hose approaching the bitter end thereof, said circuit means including a plurality of branches therein, each said branch including switch means of a type having a removable spacer of insulating material normally installed therein in a manner to maintain an interruption in said branch, each said switch means serving to complete said circuit via an associated one of said branches in response to removal of said spacer from the switch means thereof, timing means in each of said branches of a type to be electrically activated to maintain a completed circuit therethrough for a predetermined period of time and thereafter to provide an open circuit so as to limit the period of operation of said warning device.

3. A vehicle for laying hose comprising a chassis, a hose bed thereon, a length of hose disposed in said bed folded in loops in a manner disposing both ends of said hose at the same end of said hose bed, male and female fittings carried on the two ends of said hose, respectively, an alarm system carried by said vehicle for alerting an operator of the vehicle to the payout of a given loop of hose signifying the approach of the bitter end of the hose being paid out, said system including an electric warning device, electric circuit means for operating said device, said circuit means including switch means therein conditioned to be normally open and means forming a mechanical connection between said switch means and said given loop for closing said circuit means in response to paying out said given loop of hose so as to activate said warning device.

4. In a vehicle having a chassis carrying an elongate hose bed, a plurality of at least two hoses to be laid disposed in said bed, said hoses being folded in loops in a manner disposing both ends of each said hose at the trailing end of said hose bed, an alarm system carried by said vehicle for alerting an operator of the vehicle to the payout of a given loop of either hose, the payout of said given loop signifying the approach of the bitter end of an associated one of the hoses, said system including an electric warning device, electric circuit means for operating said device in response to the paying out of said given loop of either or both said hoses, said circuit means including switch means associated with each hose and conditioned to be normally open, and means forming a mechanical connection between each said given loop of said hoses and an associated one of said switch means for closing said circuit means of response to paying out said given loop of either or both of said hoses to activate said warning device, and means serving to deactivate said warning device after a predetermined period of time following activation thereof.

* * * * *